US011135042B2

(12) United States Patent
Ouyang

(10) Patent No.: US 11,135,042 B2
(45) Date of Patent: Oct. 5, 2021

(54) TOOTH CLEANER

(71) Applicant: Yifei Ouyang, Beijing (CN)

(72) Inventor: Yifei Ouyang, Beijing (CN)

( * ) Notice: Subject to any disclaimer, the term of this patent is extended or adjusted under 35 U.S.C. 154(b) by 71 days.

(21) Appl. No.: 15/750,941

(22) PCT Filed: Dec. 10, 2015

(86) PCT No.: PCT/CN2015/096948
§ 371 (c)(1),
(2) Date: Feb. 7, 2018

(87) PCT Pub. No.: WO2017/035979
PCT Pub. Date: Mar. 9, 2017

(65) Prior Publication Data
US 2018/0228581 A1    Aug. 16, 2018

(30) Foreign Application Priority Data

Sep. 1, 2015  (CN) .................. 201510550142.X

(51) Int. Cl.
*A61C 17/02*     (2006.01)
*A61C 17/022*    (2006.01)
(Continued)

(52) U.S. Cl.
CPC ........ *A61C 17/0211* (2013.01); *A61C 1/0015* (2013.01); *A61C 17/022* (2013.01); *A61C 17/0217* (2013.01); *A61C 17/20* (2013.01)

(58) Field of Classification Search
CPC . A61C 17/0211; A61C 17/0217; A61C 17/20; A61C 17/227
See application file for complete search history.

(56) References Cited

U.S. PATENT DOCUMENTS 3,379,192 A * 4/1968 Warren, Jr. ........ A61C 17/0211
                                                    601/164
4,106,501 A    8/1978 Ozbey
(Continued)

FOREIGN PATENT DOCUMENTS

CN         2496417 Y     6/2002
CN       201847790 U     6/2011
(Continued)

OTHER PUBLICATIONS

Office Action of the corresponding KR application 10-2018-7003648 dated Dec. 18, 2018.
(Continued)

*Primary Examiner* — Nicholas D Lucchesi
(74) *Attorney, Agent, or Firm* — Muncy, Geissler, Olds & Lowe, P.C.

(57) ABSTRACT

The invention discloses a tooth cleaner mainly composed of a brace and a handle, the brace comprises an upper tooth socket and a lower tooth socket, a plurality of small open holes which are arranged at intervals are distributed in the upper tooth socket and the lower tooth socket, one end of each of the small open holes is connected with a first guide pipe embedded into the brace, the other ends of the first guide pipes extend into the handle and are connected with a pump outlet of a pump module arranged inside the handle, the pump module also comprises a pump air inlet and a pump water inlet, the pump water inlet of the pump module is connected with a water storage module in the handle by a guide pipe, and the pump air inlet of the pump module communicates with an air inlet in the surface of the handle by a guide pipe. By using the tooth cleaner, the problems of poor cleaning and atomizing effects and poor user experience of the original tooth cleaner are solved.

16 Claims, 8 Drawing Sheets

(51) Int. Cl.
*A61C 17/20* (2006.01)
*A61C 1/00* (2006.01)

(56) References Cited

U.S. PATENT DOCUMENTS

| | | | |
|---|---|---|---|
| 6,126,444 | A | 10/2000 | Horiguchi |
| 6,155,824 | A | 12/2000 | Kamen et al. |
| 2007/0111157 | A1 | 5/2007 | Huotari et al. |
| 2009/0176186 | A1 | 7/2009 | Swift |
| 2009/0208898 | A1 | 8/2009 | Kaplan |
| 2010/0273126 | A1 | 10/2010 | Janssen et al. |
| 2011/0027746 | A1 | 2/2011 | Mcdonough et al. |
| 2012/0021375 | A1 | 1/2012 | Binner |
| 2012/0189976 | A1* | 7/2012 | Mcdonough ....... A61C 17/0202 433/89 |
| 2012/0295218 | A1 | 11/2012 | Moll |
| 2014/0072931 | A1 | 3/2014 | Fougere et al. |
| 2015/0024340 | A1 | 1/2015 | De Gentile |
| 2015/0044628 | A1 | 2/2015 | Flyash |
| 2015/0282908 | A1 | 10/2015 | Wada et al. |
| 2016/0270892 | A1 | 9/2016 | Yoo |
| 2017/0056143 | A1* | 3/2017 | Hyun ..................... A61C 17/02 |
| 2018/0184795 | A1* | 7/2018 | Pai .......................... A46D 99/00 |
| 2018/0184857 | A1* | 7/2018 | Pai .......................... A46B 9/045 |

FOREIGN PATENT DOCUMENTS

| | | | |
|---|---|---|---|
| CN | 104302243 | A | 1/2015 |
| CN | 104367391 | A | 2/2015 |
| CN | 104771234 | A | 7/2015 |
| CN | 204839802 | U | 12/2015 |
| CN | 204971671 | U | 1/2016 |
| CN | 205107937 | U | 3/2016 |
| GB | 2253351 | A | 9/1992 |
| JP | 2002507450 | A | 3/2002 |
| JP | 2004057315 | A | 2/2004 |
| JP | 2007105190 | A | 4/2007 |
| JP | 2007508087 | A | 4/2007 |
| JP | 2011506025 | A | 3/2011 |
| JP | 2013541693 | A | 11/2013 |
| WO | WO2007036290 | A1 | 4/2007 |
| WO | WO2014073382 | A1 | 5/2014 |
| WO | WO2015072676 | A1 | 5/2015 |
| WO | WO2015126102 | A | 8/2015 |

OTHER PUBLICATIONS

Office Action of the corresponding JP application 2018-526285 dated Jan. 31, 2019.
Office Action of the corresponding CN application 201510550142.X dated Dec. 21, 2017.
Office Action of the corresponding CN application 201510550142.X dated Jul. 25, 2018.
Extended search report of the corresponding EP application 15902785 dated Mar. 1, 2019.
Japanese Office Action with English Translation dated Aug. 7, 2019.
Notice of Acceptance of the corresponding AU Application, dated Jul. 13, 2018, Priority No. 201510550142.X, filed Sep. 1, 2015 CN, 3 pages.

* cited by examiner

TOOTH CLEANER

TECHNICAL FIELD

The invention belongs to the technical field of intelligent electronic equipment serving as daily products and particularly relates to a tooth cleaner.

BACKGROUND ART

The tooth surface of each tooth and slits among teeth can be effectively cleaned by moving a toothbrush head of no matter a manual toothbrush or an electric toothbrush or a sonic toothbrush in traditional toothbrushes about the oral cavity up and down, left and right as well as inside and outside. however, the motion of the toothbrush head in the oral cavity is required to be actively operated by a tooth brushing person, preferably, the toothbrush head is moved in order, and thus, the tooth cleaning effect can be ensured, or else, the tooth surface or the slits among the teeth cannot be effectively cleaned. Specifically, the problem that most of children are reluctant to brush teeth becomes a major problem worried by extensive parents.

Recently, an intelligent electric toothbrush appears on the market, and the intelligent electric toothbrush can also be connected with mobile equipment by Blueteeth while cleaning the slits among the teeth by virtue of acoustic waves so as to record tooth brushing time and tooth brushing duration; and the toothbrush is also internally provided with a 3D motion sensor which can be used for calculating whether dead angles are cleaned or not; however, the toothbrush is still required to be actively operated in order by the tooth brushing person, or else, the tooth cleaning effect is affected.

In addition, a mist spraying or air spraying toothbrush which is used for cleaning by spraying water or air into the oral cavity at high speed appears on the market, although a similar mist spraying toothbrush exist, the toothbrush is only provided with one spraying head to result in that only one place in the oral cavity can be sprayed once, multiple spraying is required, and some hidden parts in the oral cavity are not easily cleaned, so that the cleaning range and effect are limited, and the user experience is relatively poor.

SUMMARY OF THE INVENTION

The technical problem to be solved by the invention is to provide a tooth cleaner for solving the problems of poor atomizing effect, cleaning effect and user experience of the original tooth cleaner.

The technical scheme adopted by the invention is as follows: the tooth cleaner is mainly composed of a brace and a handle, the brace comprises an upper tooth socket and a lower tooth socket, wherein a plurality of small open holes which are arranged at intervals are distributed in the upper tooth socket and the lower tooth socket, one end of each of the small open holes is connected with a guide pipe embedded into the brace, the other ends of the guide pipes extend into the handle and are connected with a pump outlet of a pump module arranged inside the handle, the pump module further comprises a pump air inlet and a pump water inlet, the pump water inlet of the pump module is connected with a water storage module in the handle by a guide pipe, and the pump air inlet of the pump module communicates with an air inlet in the surface of the handle by a guide pipe.

Further, pressure sensors are also embedded into a connecting part of the brace.

Further, the handle is also internally provided with an intelligent control module, the pressure sensors are connected with the intelligent control module by signal lines, and the intelligent control module is also respectively connected with the water storage module and the pump module by signal lines.

Further, each of the upper tooth socket and the lower tooth socket is formed by enclosing a bottom wall and two side walls, a plurality of bulges which are arranged at intervals are also distributed on the inner wall surface of two side walls of the upper tooth socket and the lower tooth socket, and the small open holes are also located on the inner wall surfaces of the two side walls.

Preferably, at least parts of the bulges are integrally semi-hollow, the outer parts of the bulges are closed, the inner parts of the bulges extending into the inner walls of the tooth sockets are arranged to be open and communicate with second guide pipes embedded in the brace.

Alternatively, the second guide pipes are superposed with the first guide pipes connected with the small open holes, namely the second guide pipes and the first guide pipes are the same guide pipes.

Preferably, at least two of the first guide pipes in the brace are combined to form at least one public pipeline extending into the handle to be connected with a pump outlet of the pump module.

Alternatively, the other ends of the second guide pipes also extend into the handle, and all the second guide pipes form the same common pipeline extending into the handle to be connected with the other pump outlet of the pump module.

Further, the tooth cleaner further comprises an intelligent control module arranged in the handle, the pressure sensors are connected with the intelligent control module by signal lines, and the intelligent control module is also respectively connected with the water storage module and the pump module by signal lines.

Further, the tooth cleaner further comprises an acoustic wave transducer, and the acoustic wave transducer is connected with an excitation module in the handle by a signal line and is arranged in the brace or on a position in the handle close to the brace.

Further, the pump module is a program control pump, the program control pump is provided with a piston pump unit, the piston pump unit comprises an electric driving mechanism, a piston core rod and an piston empty cylinder, at least one opening is formed in the piston empty cylinder, a one-way valve is arranged between each of the openings and the pump air inlet, a one-way valve is arranged between each of the openings and the pump water inlet, and a one-way valve is arranged between each of the openings and each of the pump outlets.

Further, the opening communicating with the pump air inlet is formed in the front or side end surface of the piston empty cylinder, the opening communicating with the pump water inlet is formed in the front or side end surface of the piston empty cylinder, and the openings communicating with the pump outlets are formed in the front end surface of the piston empty cylinder.

Further, the opening communicating with the pump air inlet is formed in the front or side end surface of the piston empty cylinder, the opening communicating with the pump outlet is formed in the front end surface of the piston empty cylinder, and the pump outlet is connected with the opening formed in the front end surface of the piston empty cylinder by a guide pipe in which a through hole connected to the pump water inlet is additionally formed.

Further, a program control valve is also arranged between the pump module and the brace, is connected with the intelligent control module by a signal line and is provided with an inlet passage and at least two outlet passages, the inlet passage of the program control valve is connected with the pump outlet of the pump module by a guide pipe, and the outlet passages of the program control valve are connected with the public pipelines extending into the handle part from the brace.

Further, the handle is also internally provided with a wireless communication module and/or an audio module, and the wireless communication module and/or the audio module is connected with the intelligent control module by a signal line.

Further, the handle is also internally provided with a rechargeable battery, a wireless electric energy receiving unit and a display unit, and the wireless electric energy receiving unit is connected with a wireless electric energy transmitting unit on an outer rechargeable base. The display unit can be used for prompting the charging state of the cleaner by an LED indicating lamp, a liquid crystal touch panel or a voice prompt input way.

Preferably, the upper tooth socket is connected with the lower tooth socket by a connecting part which is integrally molded together with the upper tooth socket and the lower tooth socket, two side walls of each of the upper tooth socket and the lower tooth socket include an inner side wall close to the throat part and an outer side wall close to the lip art, wherein a gap is formed in the central part of the outer side wall of the upper tooth socket.

Further, the water storage module of the tooth cleaner related to the invention comprises a hollow cavity, the hollow cavity is internally provided with a guide pipe, one end of the guide pipe is connected with the pump water inlet of the pump module, the other end of the guide pipe extends into the hollow cavity, and the water storage module also comprises a water storage box matched with the hollow cavity.

Further, the water storage module of the tooth cleaner related to the invention comprises a hollow cavity, one end of the hollow cavity is connected with the pump water inlet of the pump module by a guide pipe, and the water storage module is also provided with an openable sealing cover and an air return aperture provided with a large opening in one end and a small opening in the other end.

Further, the water storage module related to the invention comprises a hollow cavity, the hollow cavity is internally provided with a guide pipe, one end of the guide pipe is connected with a pump water inlet of the pump module, the other end of the guide pipe extends into the hollow cavity, a water injection hole and an air return hole are formed in one end of the hollow cavity, the cleaner also comprises a water injection module matched with the hollow cavity, the water injection module is composed of an insertion pipe, an empty cylinder and a piston core rod, and the insertion pipe can be inserted to the water injection hole to inject water to the water storage module.

Compared with the prior art, the tooth cleaner provided by the invention adopts an electric spray-cleaning way, so that the inconvenience caused by manually brushing teeth is omitted, the tooth brushing person only needs to perform occlusion and non-occlusion motion, moving the tooth cleaner about the oral cavity is not needed, and even if no toothpaste is used, the teeth can be effectively cleaned by using bristles, in addition, hidden parts such as slits among the teeth can be favorably cleaned by a mist sprayed from a cleaning head, and compared with the original electric water spraying or air spraying way, the mist spraying way has a more excellent oral cavity cleaning effect, is good in atomizing effect and also brings more comfortable cleaning experience for a user.

DETAILED DESCRIPTION OF THE INVENTION

The following embodiments cannot be construed as limitations for the scope of the invention, but merely used for more clearly explaining the technical scheme of the invention.

The invention is further explained in detail below in conjunction with the drawings and specific embodiments.

Figure 1:
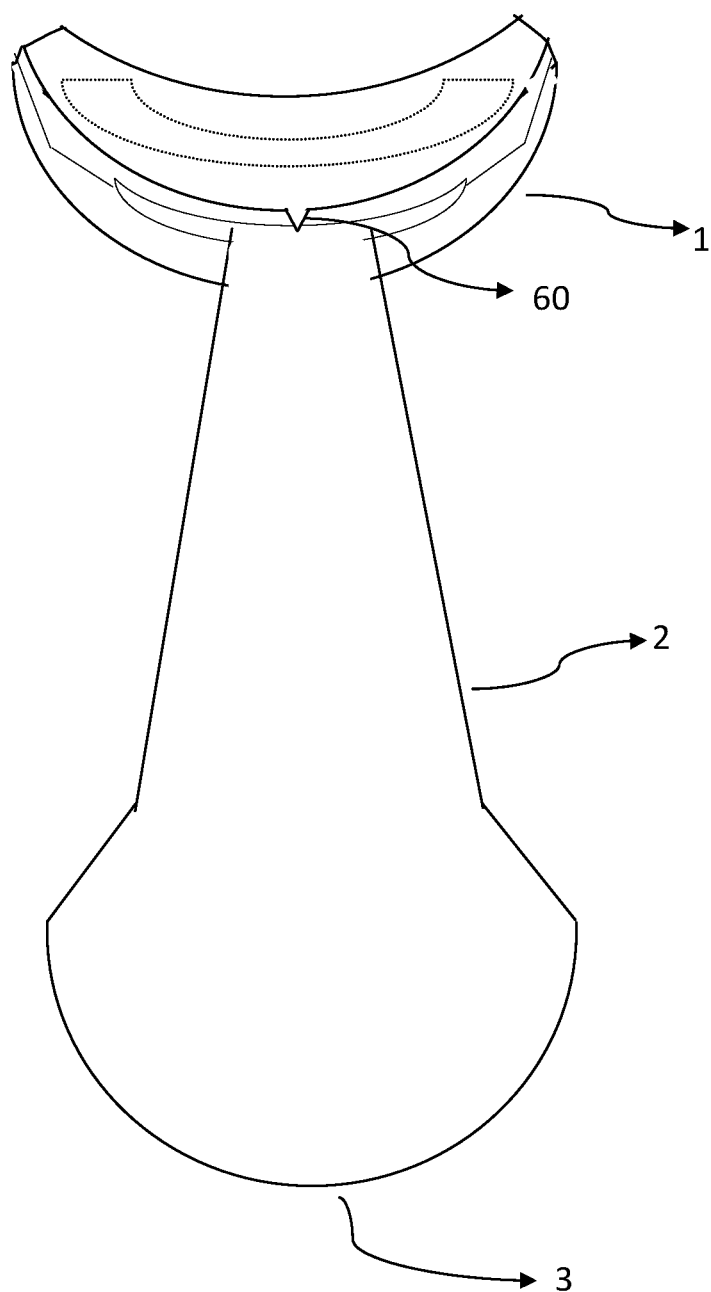
FIG. 1 is an external structural diagram of the tooth cleaner disclosed by an embodiment of the invention.

With reference to FIG. 1, a tooth cleaner disclosed by the embodiment of the invention comprises a brace 1 and a handle 2, the bottom of the handle 2 is a bottom end 3 of which the section diameter is larger than that of the handle 2, and the bottom end 3 is packaged together with a shell of the handle 2.

Figure 2:
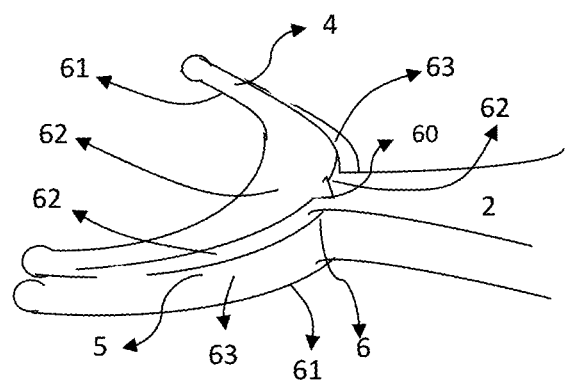
FIG. 2 is a partially-enlarged view of the brace 1 in FIG. 1.
Figure 3:
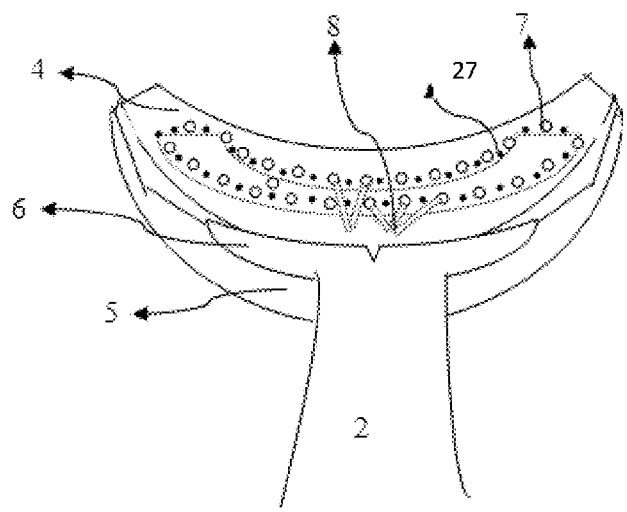
FIG. 3 is a specific structural schematic diagram of the brace part of the brace-type tooth cleaner disclosed by the embodiment of the invention.

In conjunction with reference to FIG. 2 and FIG. 3, the brace 1 comprises an upper tooth socket 4, a lower tooth socket 5 and a connecting part 6 for connecting the upper tooth socket and the lower tooth socket, wherein a plurality of small open holes 7 are formed in the upper tooth socket and the lower tooth socket, each of the small open holes 7 corresponds to each of slits among teeth of a user, one end of each of the small open holes 7 is connected with one of a plurality of first guide pipes 8 embedded into the brace 1, the other ends of the first guide pipes 8 extend into the handle 2 and are connected with a pump module 9 arranged inside the handle 2, and a liquid, a gas or a mist (a mist way is adopted disclosed by the invention) can be sprayed from the small open holes 7 under the action of the pump pressure of the pump module 9 to clean the slits among the teeth. The layout from the small open holes 7 can be realized by establishing a three-dimensional model of the whole dentition of the user by tooth modularization or 3D scanning, and then, arranging the three-dimensional model to correspond to each of the slits among the teeth. Of course, the small open holes 7 are arranged at the outer end points corresponding to four molar teeth at the outer side. Each of the upper tooth socket and the lower tooth socket is formed by enclosing a bottom wall and two side walls and has a U-shaped section, the two side wall include an inner side wall close to the throat part and an outer side wall close to the lip part, wherein a V-shaped gap 60 is also formed in the central part of the outer side wall of the upper tooth socket 4, and when the user wears the brace and performs an occlusion action, the position of the gap 60 corresponds to the upper lip frenulum of the user so as to facilitate locating when the brace is worn.

The upper tooth socket and the lower tooth socket are provided with a plurality of bulges 27, at least parts of the bulges 27 are semi-hollow, the rest parts of the bulges 27 can be solid, or all the bulges 27 are set to be semi-hollow, the bulges 27 have a certain elasticity, the bulges 27 and the small open holes 7 are spaced and distributed on the inner wall surfaces of the tooth sockets, and the amount of the bulges 27 can be relatively large and is far larger than that of the small open holes 7; the bulges 27 can be hemispherical or hemi-ellipsoidal or round trapezoidal or can have any other proper shape without any limitation herein. When the bulges 27 are semi-hollow, the outer parts 47 of the bulges are closed, the inner parts of the bulges 27 are arranged to be open after extending into the tooth sockets and communicate with second guide pipes 58 embedded in the brace 1. on one hand, the second guide pipes 58 and the first guide pipes 8 which are embedded into the brace and communicate with the small open holes 7 can be commonly used as the same guide pipes, namely the second guide pipes 58 are superposed with the first guide pipes 8, and on the other hand, the bulges 27 can be independently provided with special guide pipes (the second guide pipes 58 disclosed by the invention) for providing power for the bulges 27.

Figure 4:
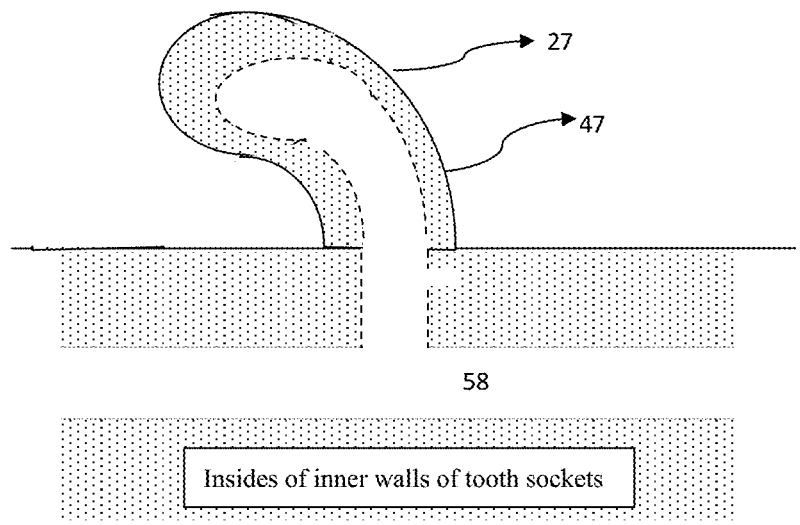
FIG. 4(a) is a structural schematic diagram of bulges of the brace-type tooth cleaner disclosed by the embodiment of the invention in a normal state.
FIG. 4(b) is a structural schematic diagram of the bulges of the brace-type tooth cleaner disclosed by the embodiment of the invention under a pressure.
FIG. 4(c) is a sectional view of the brace structure disclosed by the embodiment of the invention.
FIG. 4(d) is a sectional view of the brace structure disclosed by the embodiment of the invention.
FIG. 4(e) is a sectional view of the brace structure in the other embodiment of the invention.
Figure 4:
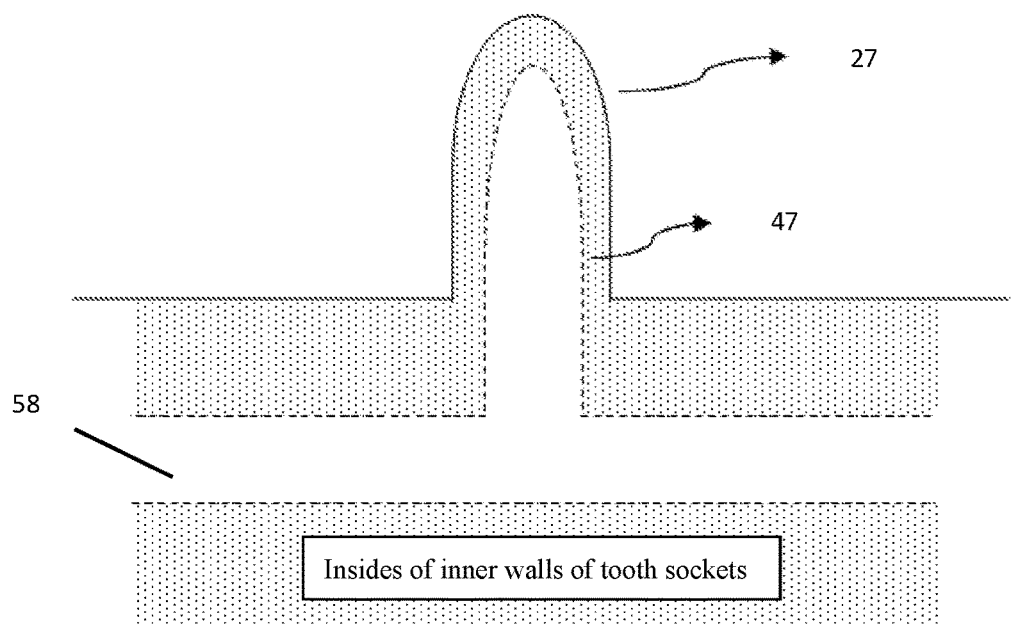
Figure 4:
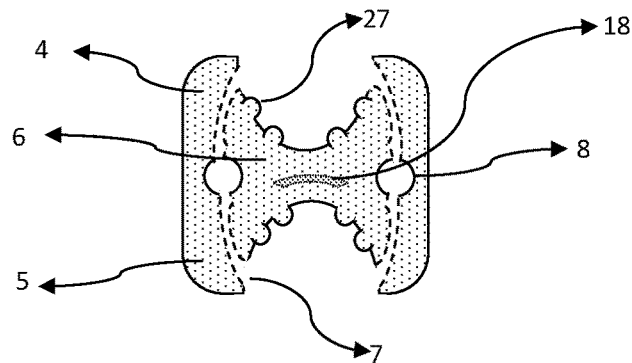
Figure 4:
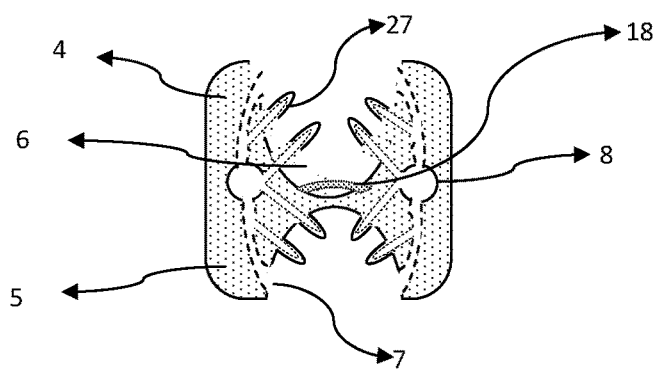

Specifically, reference to FIG. 4(*a*), FIG. 4(*a*) is a state schematic diagram of the bulges 27 in a normal state (namely when the pump module does not perform a pressure pumping action), and the bulges 27 are bent in the normal state; FIG. 4(*b*) is a state schematic diagram of the bulges 27 in a state that pressures exist in the bulges 27 (namely when the pump module performs the pressure pumping action and air pressures inside the bulges are equal to or larger than the atmospheric pressure outside the tooth cleaner), and the bulges 27 is bulged and straight in the state; and the bulges 27 are upwards bulged when the pressures in the second guide pipes 58 are increased and are shrunk when the pressures are reduced. Specifically, in the embodiment, the air at a pump outlet is rapidly pressed into the second guide pipes 58 in the tooth sockets when the pump module 9 makes a reciprocating pressure pumping action to ensure that pressures inside semi-hollow pipes 13 are rapidly increased, so that the semi-hollow bulges 27 become stiff and stretched to be in a state as shown in FIG. 4(*b*). After the pressure pumping action of the pump module 9 is ended, the pressures inside the semi-hollow bulges are reduced to return to be normal, so that the semi-hollow bulges 27 become soft and bent to be in a state as shown in FIG. 4(*a*). When the pump module 9 makes the reciprocating pressure pumping action, the semi-hollow bulges 27 can repeatedly make stretching and bending actions, so that tooth surfaces are cleaned; in addition, the bulges 27 are bent in a normal state, the distance from a bent state to an upright state is very short, and the run length is small, so that the two different states can be very conveniently switched, and furthermore, the tooth cleaning effect is achieved.

Figure 5:
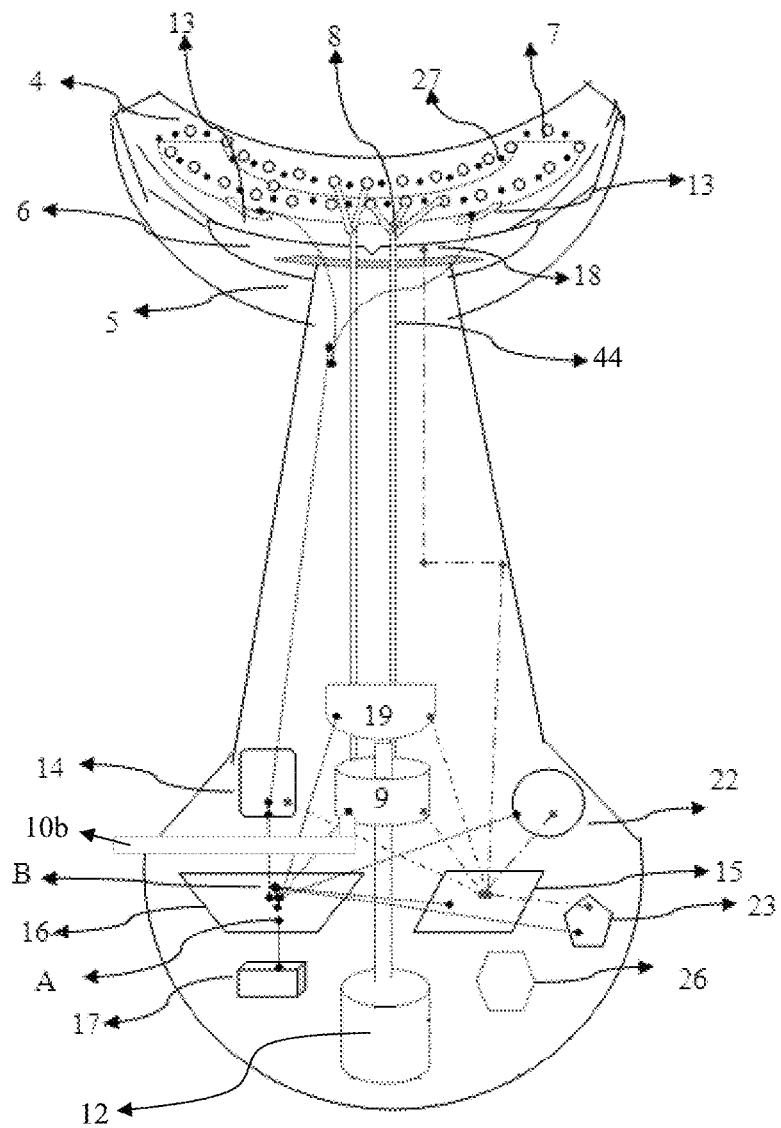
FIG. 5 is a schematic diagram of an internal structure of the brace-type tooth cleaner disclosed by the invention.

At least one pressure sensor 18 is also embedded into the connecting part 6 of the brace 1, the pressure sensors 18 are preferably designed to be flake-like to be capable of increasing the induction area during occlusion, and the pressure sensors 18 are connected with an intelligent control module arranged in the handle 2. Specifically, in the embodiment, the two pressure sensors 18 are provided and are respectively located at two sides of the center of the brace 1, and sensing heads of the sensors are flake-like and are located in the center of the connecting part. The pressure sensors 18 are preferably active sensors, one end of each of the pressure sensors 18 is connected with a power switch by a conducting wire, the other end of each of the pressure sensors 18 is connected with the intelligent control module 15, and the pressure sensors 18 can be used for detecting the occlusion action of a user. When the pressure sensors 18 detect to find that the pressure reaches a set pressure value during occlusion of the upper tooth socket and the lower tooth socket, a signal is sent to the intelligent control module 15, and the intelligent control module 15 gives a pressure pumping starting instruction to the pump module 9, a liquid, a gas or a gas-liquid mixture is sprayed from the small open holes 7 distributed in the inner wall of the brace 1 of the cleaner under the action of a pump pressure, so that the slits among the teeth are cleaned, when the pump module repeatedly performs a pressure pumping action, the pressure becomes high sometimes and becomes low sometimes, while the plurality of semi-hollow bulges 27 also located on the inner walls of the tooth sockets are also stretched sometimes and bent sometimes, and therefore, the cleaning effect is further improved by such repeated brushing, wherein an inlet of the pump module 9 can be connected with a water storage tank as shown in FIG. 5 to spray water and a mist or connected with an air inlet in the surface of the handle 2 to spray air (an air spraying way is adopted in the embodiment of the invention).

Reference to FIG. 4(*c*), it shows a structural schematic diagram of a combination of the bulges 27 and other parts on the brace. In the embodiment, the bulges 27 are solids, and the second guide pipes 58 connected with the bulges 27 and thin guide pipes 8 connected with the small open holes 7 are the same guide pipes, namely, the second guide pipes 58 and the thin guide pipes 8 are commonly used, at the moment, the bulges 27 can be regarded as arc-shaped passages which are formed on pipelines of the thin guide pipes 8 and have sections being larger than those of guide pipe bodies.

FIG. 4(*d*) shows a structural schematic diagram of the combination of the bulges 27 and other parts on the brace. Different from FIG. 4(*c*), in the embodiment, the bulges 27 are of semi-hollow body structures, and the structures and the working principles of semi-hollow bodies are described as above and are not explained herein in any greater detail. In the embodiment, the second guide pipes 58 of the bulges 27 and the thin guide pipes 8 connected with the small open holes 7 are the same guide pipes, namely, the second guide pipes 58 and the thin guide pipes 8 are commonly used, at the moment, the bulges 27 can be regarded as the arc-shaped passages which are formed on pipelines of the thin guide pipes 8 and have sections being larger than those of guide pipe bodies.

Figure 4E:
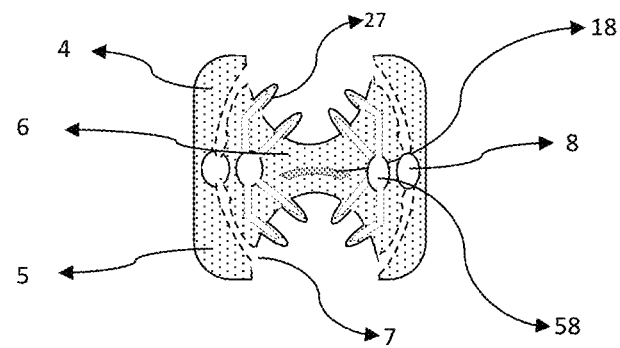

FIG. 4(e) shows a structural schematic diagram of the combination of the bulges 27 and other parts on the brace. Different from FIG. 4(d), in the embodiment, the second guide pipes 58 connected with the bulges 27 and the thin guide pipes 8 which are originally embedded into the brace and communicate with the small open holes 7 are not the same guide pipes, namely a pipeline is specially provided for providing power for the semi-hollow bulges, the plurality of second guide pipes 58 are also converged to form a passage connected to the pump module 9, namely, the pump module 9 is provided with two outlet passages, one of the outlet passages is used for the first guide pipes 8 where the small open holes 7 are located, the other outlet passage is used for the second guide pipes 58 where the bulges 27 are located, the independent arrangement has the advantage that the repeated stretching and bending actions of the bulges 27 are not affected by the condition that whether pressures exist in the original first guide pipes 8 or not, and the bulges 27 can be made to perform the repeated stretching and bending actions as long as the pump module 9 moves, wherein when the second guide pipes 58 are not superposed with the first guide pipes 8, at least two of the second guide pipes 58 form the same common pipeline which extends into the handle and is directly connected with the pump module 9. Of course, a way that a plurality of common pipelines is formed can also be adopted.

As a preferable embodiment of the invention, at least two of the first guide pipes 8 in the brace 1 are combined to form at least one public pipeline 44 extending into the handle 2. Correspondingly, the handle 2 is also internally provided with a program control valve 19, The program control valve 19 is located between the pump module 9 and the brace 1, an inlet passage of the program control valve 19 is connected with the pump outlet of the pump module 9 by a guide pipe, outlet passages of the program control valve 19 are connected with the public pipelines 44 one by one, the program control valve 19 is also connected with the intelligent control module 15 in the handle 2 by a signal line, under the control of the intelligent control module, the program control valve 19 can be used for performing selective opening or closing operation on each passage, with a one-inlet and eight-outlet program valve as an example, any passages or all the passages in eight outlet passages can be selected to be opened, other outlet passages are closed, and in order to increase the pressure of the liquid or the mist sprayed from the small open holes 7, preferably, only some outlet passages are selected to be opened every time. Thus, the guide pipe connected to each of the public pipelines 44 is of a tree-like bifurcation structure in the brace 1. Tree-like bifurcations can be uniformly distributed, namely the product of the amount of the tree-like bifurcation structures and the amount of the outlet passages of the program control valve 19 is equal to the amount of the small open holes 7, and the tree-like bifurcation structures can also be non-uniformly distributed, namely the amount of bifurcations in places which are relatively easy to clean is relatively large (namely the water pressure is relatively low); and the amount of bifurcations in places which are relatively difficult to clean is relatively small (the water pressure is increased).

In conjunction with reference to FIG. 5, as the other preferable embodiment of the invention, an acoustic wave transducer 13 is embedded into the brace 1, and the handle 2 is also internally provided with an excitation module 14 connected with the acoustic wave transducer 13 by a signal line. The excitation module 14 is used for producing an acoustic or ultrasonic frequency current, and a vibrator of the acoustic wave transducer 13 embedded into the brace 1 of the tooth cleaner produces acoustic or ultrasonic vibration under the excitation of the acoustic or ultrasonic frequency current, promotes the bulges 27 to vibrate and transfers the vibration to the tooth surface of each tooth, so that the tooth surface is further cleaned.

The connecting part 6 is integrally molded together with the upper tooth socket and the lower tooth socket. The integral molding has the advantages of small occlusion run length, benefit for the location of the upper tooth socket and the lower tooth socket and occlusion convenience.

In order to realize favorable spraying for the structure of the brace 1, mist spraying is realized in a non-ultrasonic atomizing way.

Reference to FIG. 5, the handle 2 is internally provided with at least one water storage module 12 and at least one pump module 9 (one water storage module 12 and one pump module 9 in the embodiment), the pump module 9 comprises a pump water inlet 10 a, a pump air inlet 10 b and a pump outlet 11, the pump air inlet 10 b is connected with an external air inlet 51 by a guide pipe, the pump water inlet 10 a is connected with the water storage module 12 by a guide pipe, the pump outlet 11 of the pump module 9 is connected to the public pipelines 44 by guide pipes, the public pipelines 44 and the guide pipe of the pump outlet 11 can be regarded as the same pipe, wherein the guide pipe at the pump water inlet 10 a extends into the water storage module 12, and water in the water storage module 12 is transferred to the pump module 9 by a guide pipe 5. The water is atomized under the action of the pump module 9, and the pump module 9 can be used for directly pumping the mist from the pump outlet 11, so that the brace 1 is cleaned. The program control pump is provided with a piston pump unit in which openings communicating with the pump water inlet, the pump air inlet and the pump outlet are formed, and at least one one-way valve is arranged on a position close to each opening.

Figure 6:
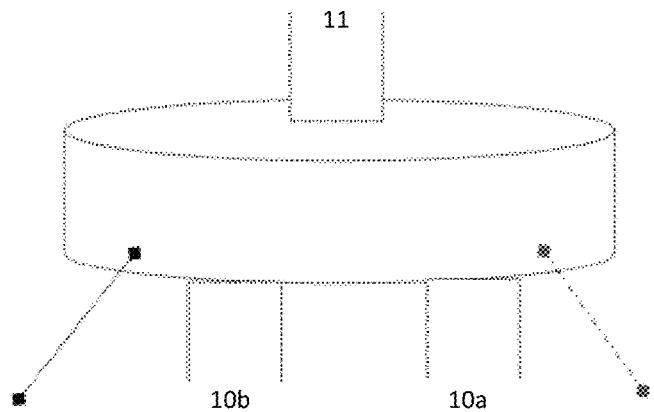
FIG. 6 is a principle diagram of a pump module of the tooth cleaner disclosed by an embodiment of the invention.

Specifically, reference to FIG. 6 and FIG. 7(a), the pump module 9 is the program control pump, the program control pump is provided with a piston pump unit, and openings communicating with the pump water inlet 10 a, the pump air inlet 10 b and the pump outlet 11 are formed in the piston pump unit, wherein the common pipeline of the second guide pipes 58 is also connected to one of the openings of the pump module 9, the public pipelines 44 of the first guide pipes 8 are also connected to one of the openings of the pump module 9, and the opening connected to the common pipeline and the opening connected to the public pipelines 44 can be commonly used as the same opening or can be separately used. In order to provide convenience for illustration, the guide pipe communicating with the pump air inlet 10 b is named as a third guide pipe 83, the guide pipe communicating with the pump outlet 11 is named as a fourth guide pipe 84, the side end of the fourth guide pipe 84 also communicates with a fifth guide pipe 85 communicating with the pump water inlet 10 a, each of the fourth guide pipe 84 and the fifth guide pipe 85 is provided with a communicating part to form a "T"-shaped pipe, at least one one-way valve is arranged on a position, close to each of the openings of the piston pump unit, in the third guide pipe 83, the fourth guide pipe 84 and the fifth guide pipe 85, the one-way valve at the pump air inlet 10 *b* only allows outside air to enter, the one-way valve at the pump water inlet 10 *a* only allows the water in the water storage module 12 to enter, the one-way valve at the pump outlet 11 only allows gases in a pump to be exhausted outwards from the piston pump unit, wherein the one-way valve Y close to the pump outlet 11 is located below the position of a communicating part of the third guide pipe 83 and the fourth guide pipe 84. The program control pump is connected to a power supply switch module 16 inside the handle 2 by a conducting wire and is connected to the intelligent control module 15 in the handle 2 by a signal line. The intelligent control module 15 outputs control signals for pressure pumping action starting, pressure pumping action stopping and pressure pumping action strength to the pump module 9. The piston pump unit comprises an electric driving mechanism 91, a piston core rod 92 and a piston empty cylinder 93, and the electric driving mechanism 91 drives the piston core rod 92 to make reciprocating motion in the piston empty cylinder 93 to control the mist entering from the pump inlet 10 to be sprayed out from the pump outlet 11.

Figure 7:
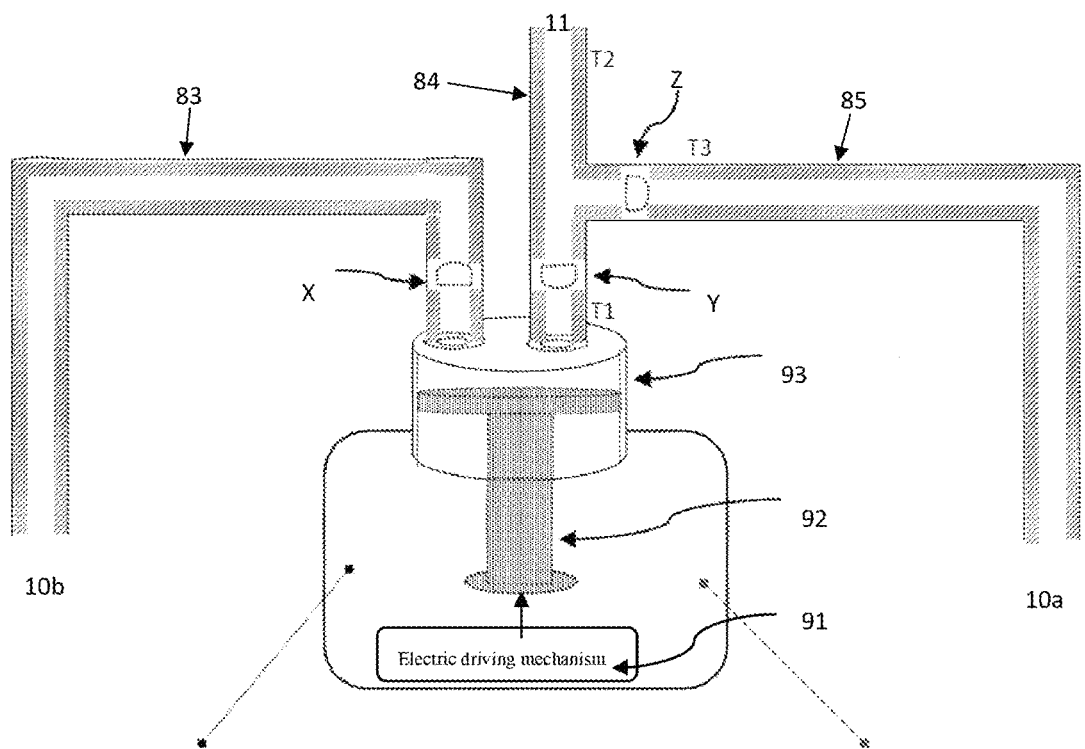
FIG. 7(a) is an embodiment of the pump module of the tooth cleaner disclosed by the invention.
FIG. 7(b) is the other embodiment of the pump module of the tooth cleaner disclosed by the invention.
FIG. 7(c) is another embodiment of the pump module of the tooth cleaner disclosed by the invention.
FIG. 7(d) is yet another embodiment of the pump module of the tooth cleaner disclosed by the invention.
Figure 7B:
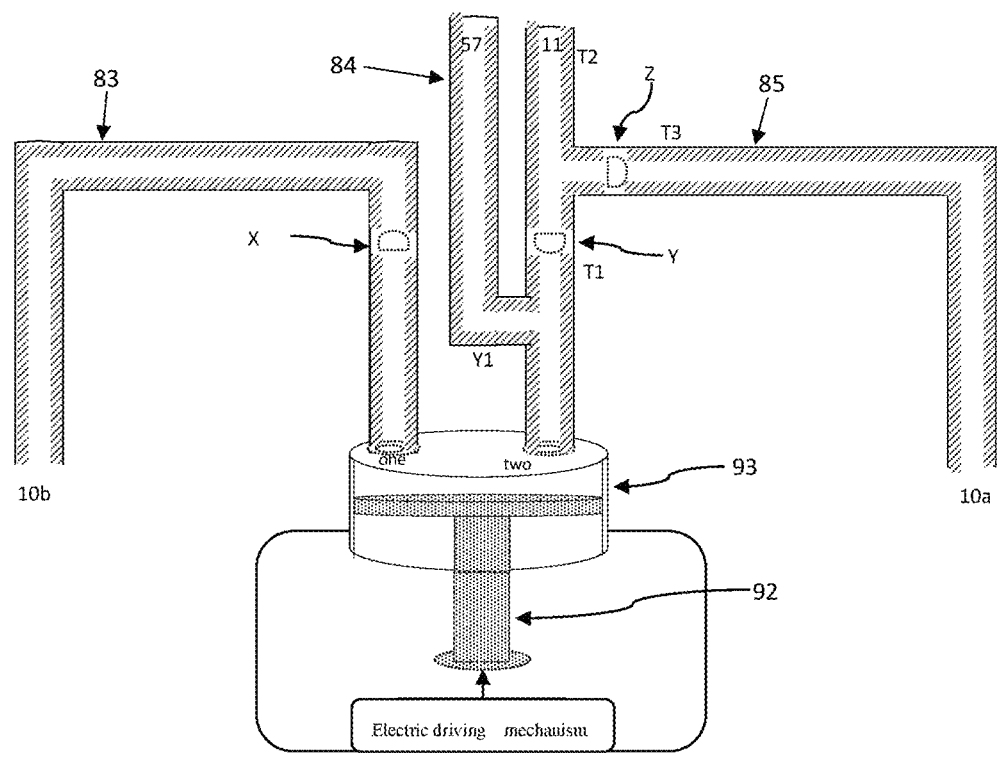
Figure 7C:
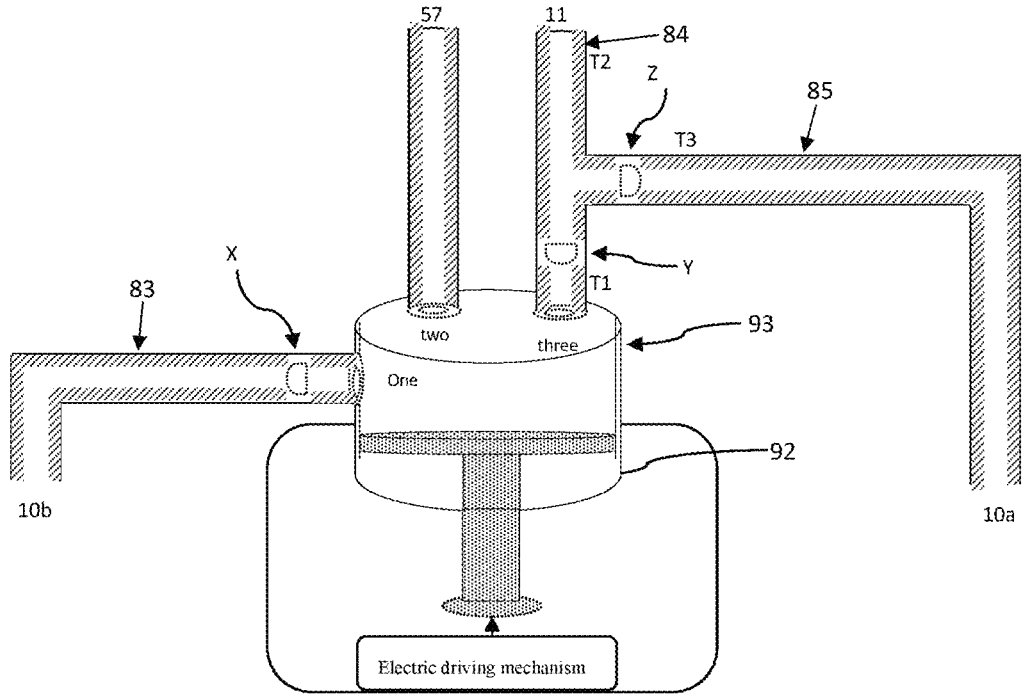
Figure 7:
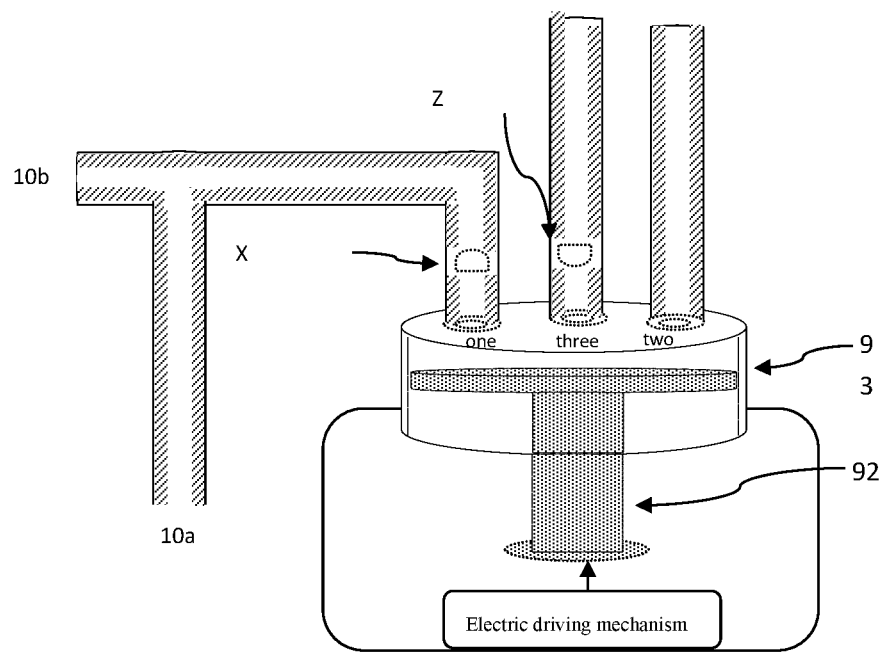

Reference to FIG. 7(*a*) in which the second guide pipes 58 connected with the semi-hollow bulges 27 and the first guide pipes 8 connected with the small open holes 7 are commonly used, namely the second guide pipes are superposed with the first guide pipes 8, and thus, the actions of the semi-hollow bulges 27 are affected by the condition that whether pressures exist in the first guide pipes 8 or not. In order to facilitate operating the pump, the pump air inlet 10*b* and the pump outlet 11 of the piston pump unit are arranged on the same surface of the piston empty cylinder 93, and the electric driving mechanism 91 drives the piston core rod 92 to move on the other surface of the piston empty cylinder 93.

The working principle of the piston pump unit is as follows:

when the piston core rod 92 of the piston pump unit is drawn out, a negative pressure is formed in the piston empty cylinder 93. At the moment, a one-way valve X is opened, and air enters the piston empty cylinder 93 by the air inlet through a pipeline and the one-way valve X. The one-way valve Y is closed, and the T1 end of the "T"-shaped pipe is blocked.

When the piston core rod 92 of the piston pump unit is pushed, the air pressure inside the piston empty cylinder 93 is rapidly increased. At the moment, the one-way valve X is closed, an opening passage between the piston empty cylinder and the air inlet is blocked. The one-way valve Y is opened, the air inside the piston empty cylinder is pressed into the "T"-shaped pipe and is rapidly sprayed towards the T2 end of the "T"-shaped pipe. At the same time, a one-way valve Z inside the T3 end is opened, a water flow flows from the T3 end to the T2 end of the "T"-shaped pipe by the water inlet through the pipeline and the one-way valve Z, and an air and water mixture (or named as "mist") is sprayed out from the T2 end of the "T"-shaped pipe.

Reference to FIG. 7(*b*) in which the second guide pipes 58 connected with the semi-hollow bulges 27 and the first guide pipes 8 connected with the small open holes 7 are separately used, wherein two openings (an opening I and an opening II) are respectively formed in the front end surfaces of the piston empty cylinder 93, wherein one of the openings (the opening I) is connected to the pump air inlet 10*b*, and an opening is also formed in the guide pipe connected with the other opening (the opening II), so that the Y1 end and the T1 end of a two-shunt flow are formed, the pump outlet 57 where the Y1 end is located is connected to the inside of the handle where the second guide pipes 58 are located to form the common pipeline, the T1 end is the T1 end of the "T"-shaped pipe, and the T1 end of the "T"-shaped pipe is provided with the one-way valve Y. the pump outlet 11 where the T2 end of the "T"-shaped pipe is located is connected to the public pipeline 44 for providing the mist for the small open holes 7, and the T3 end of the "T"-shaped pipe is connected to the pump water inlet 10*a* by a guide pipe and is provided with the one-way valve Z. Of course, it is also possible that an opening connected to the common pipeline formed in the handle by the second guide pipes 58 is independently formed in the front end surface of the piston empty cylinder 93, and the two-shunt flow way is not adopted.

The working principle of the piston pump unit is as follows:

when the piston core rod of the piston pump unit is drawn out, the negative pressure is formed in the piston empty cylinder. At the moment, the one-way valve X on the opening I is opened, and air enters the piston empty cylinder by the air inlet through the pipeline and the one-way valve X; the air in the semi-hollow bulges 27 are sucked by the Y1 end of the opening II to accelerate the shrinkage and bending of the semi-hollow bulges; and the one-way valve Y at the T1 end of the opening II is closed, and the T1 end of the "T"-shaped pipe is blocked. When the piston core rod of the piston pump unit is pushed, the air pressure inside the piston empty cylinder is rapidly increased, at the moment, the one-way valve X on the opening I is closed, and the opening passage located between the piston empty cylinder and the pump air inlet 10*b* is blocked; air is pressed into the semi-hollow bulges by the Y1 end of the opening II; and the air pressures inside the semi-hollow bulges are rapidly increased, so that the semi-hollow bulges are stretched.

Reference to FIG. 7(*c*) in which the second guide pipes 58 connected with the semi-hollow bulges 27 and the first guide pipes 8 connected with the small open holes 7 are separately used, wherein two openings (an opening II and an opening III) are formed in the front end surface of the piston empty cylinder 93 and are respectively connected with the pump outlet 11 communicating with the public pipelines 44 for the small open holes 7 and the pump outlet 57 communicating with the common pipeline for the semi-hollow bulges 27; in addition, the opening (the opening I) is formed in the side end surface of the piston empty cylinder 93 and is connected to the pump air inlet 10*b* by a guide pipe. Moreover, the opening II and the opening III can be commonly used as the same opening, and at the moment, only a through hole is required to be additionally formed in the guide pipe connected to the opening to form the two-shunt flow way, which is not explained herein in any greater detail.

The working principle of the piston pump unit is as follows:

when the piston core rod of the piston pump unit is drawn out, the negative pressure is formed in the piston empty cylinder. The air in the semi-hollow bulges 27 can be firstly sucked by the opening II to further accelerate the shrinkage and bending of the semi-hollow bulges 27. When the piston core rod is further drawn out to make the position of the piston core rod return to the rear end of the opening I, the negative pressure of the piston empty cylinder 93 drives the one-way valve X on the opening I to be opened, and air enters the piston empty cylinder by the air inlet through the one-way valve X. The one-way valve Y on the opening III of the piston empty cylinder is closed; and the T1 end of the "T"-shaped pipe is blocked. When the piston core rod of the piston pump unit is pushed, the air pressure inside the piston empty cylinder is rapidly increased. At the moment, the one-way valve X on the opening I is closed, and the opening passage between the piston empty cylinder and the pump air inlet 10b is blocked; air is pressed into the semi-hollow bulges by the opening II; the air pressures inside the semi-hollow bulges are rapidly increased, so that the semi-hollow bulges are stretched; and the one-way valve Y on the opening III is opened, and the air inside the piston empty cylinder is pressed into the "T"-shaped pipe and is rapidly sprayed towards the T2 end of the "T"-shaped pipe. At the same time, the one-way valve Z inside the T3 end is opened, the water flow flows from the T3 end to the T2 end of the "T"-shaped pipe by the pump water inlet 10a through the pipeline and the one-way valve Z. The air and water mixture (or named as "mist") is sprayed out from the T2 end of the "T"-shaped pipe.

Reference to FIG. 7(d) in which the pump water inlet 10a and the pump air inlet 10b are commonly used as the same opening (the opening I located in the front end surface of the piston empty cylinder), the two openings (the opening II and the opening III) are also formed in the front end surface of the piston empty cylinder 93, the opening II is connected to the pump outlet 11 communicating with the public pipelines 44 for the small open holes 7 by a guide pipe, and the opening III is connected to the pump outlet 57 communicating with the common pipeline for the semi-hollow bulges 27 by a guide pipe. Of course, in the embodiment, the opening I can also be arranged on the side end surface of the piston empty cylinder 93, or the opening II and the opening III can be commonly used as the same opening, and at the moment, only the through hole is required to be additionally formed in the guide pipe connected to the opening to form the two-shunt flow way, which is not explained herein in any greater detail.

The working principle of the piston pump unit is as follows:

when the piston core rod 92 of the piston pump unit is drawn out, the negative pressure is formed in the piston empty cylinder 93. At the moment, the one-way valve X on the opening I is opened, the air enters the piston empty cylinder 93 from the pump air inlet 10b by the one-way valve X, and the water enters the piston empty cylinder 93 from the pump water inlet 10a by the one-way valve X. The mist in the bulges is sucked by the opening II to accelerate the shrinkage and bending of the semi-hollow bulges 27. The one-way valve Z on the opening III is closed, and the opening III is blocked. When the piston core rod of the piston pump unit is pushed, the air pressure inside the piston empty cylinder is rapidly increased, at the moment, the one-way valve X on the opening I is closed, and the passage located between the piston empty cylinder 93 and the pump water inlet 10a is blocked. The mist is pressed into the semi-hollow bulges 27 by the opening II. The air pressures inside the bulges are rapidly increased so that the bulges are stretched. The one-way valve Z on the opening III is opened, and the air and water mixture (or named as "mist") in the piston empty cylinder 93 is rapidly sprayed out.

What needs to be explained is that no one-way valves are arranged between the common pipeline and each of the openings of the piston empty cylinder if the semi-hollow bulges 27 is independently provided with the special passage, namely the passage and the first guide pipes 8 are not commonly used in the structure of the pump module in the FIG. 7(a) to FIG. 7(d), and therefore, when the piston is drawn in a reciprocated way, the bulges 27 can realize free air exchange without influences from the air pressures inside the guide pipes where the small open holes 7 are formed. In addition, the opening for connecting the pump outlet 57 where the common pipeline is located to the opening formed in the front end surface of the piston empty cylinder and the opening for connecting the pump outlet where the public pipelines are located to the opening formed in the front end surface of the piston empty cylinder can be same or different, and the two-shunt flow way is adopted when the different openings are adopted.

In the embodiment of the invention, the water storage module 12 also comprises a hollow cavity 30 and a heating unit, the hollow cavity 30 is filled with a liquid, and the heating unit is mainly used for heating water in the hollow cavity 30.

Figure 8:
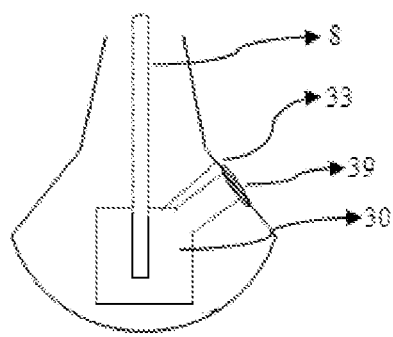
FIG. 8 is an embodiment of a water storage module of the tooth cleaner disclosed by an embodiment of the invention.

In addition, as a specific embodiment of the water storage module 12 disclosed by the invention, reference to FIG. 8, the water storage module is provided with a sealing cover 39. A rinse solution can be directly injected into the hollow cavity 30 of the water storage module after the sealing cover 39 is uncovered by a user. Preferably, the top of the hollow cavity 30 is also provided with an air return aperture 33. An opening in one end of the air return aperture 33 faces to the outer part of the hollow cavity 30 and is relatively large; and an opening in the other end faces to the inside of the hollow cavity 30, is relatively small and and is flat. The small aperture 33 has a certain elasticity and is tightly closed at ordinary times so that the water in the hollow cavity 30 cannot overflow through the air return aperture. When the negative pressure (the air pressure inside the cavity is lower than the air pressure outside the cavity) exists in the hollow cavity of the water storage module 12, the external air can enter the hollow cavity by the air return aperture 33. The air return aperture 33 can be independently arranged and can also be arranged on the sealing cover 39.

Figure 9:
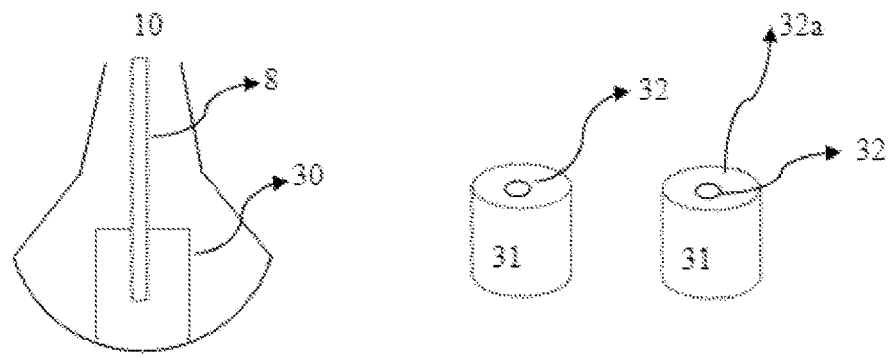
FIG. 9 is the other embodiment of the water storage module of the tooth cleaner disclosed by the embodiment of the invention.

As the other embodiment of the water storage module 12 disclosed by the invention, reference to FIG. 9, the water storage module 12 is provided with a hollow cavity 30 in which a guide pipe is arranged, one end of the guide pipe is connected with the pump inlet 10 of the pump module 9, and the other end of the guide pipe extends into the hollow cavity 30 in which a water storage box 31 matched with the hollow cavity 30 is arranged. Preferably, an open hole 32 with a sealing cover and a small air return hole 32a are formed in the upper end of the water storage box. The sealing cover of the water storage box 31 is closed, the guide pipe arranged in the hollow cavity supports against the open hole 32 of the water storage box 31 when the water storage box is inserted to the hollow cavity 30 of the handle part 2, so that the sealing cover of the open hole of the water storage box is extruded by one end of the guide pipe in the hollow cavity 30 and extends into the water storage box 31, wherein the water storage box can be prefilled with a professional rinse solution and is sealed in the whole process from prefilling to transportation, storage and even use, so that a liquid in the water storage box is prevented from going bad.

Figure 10:
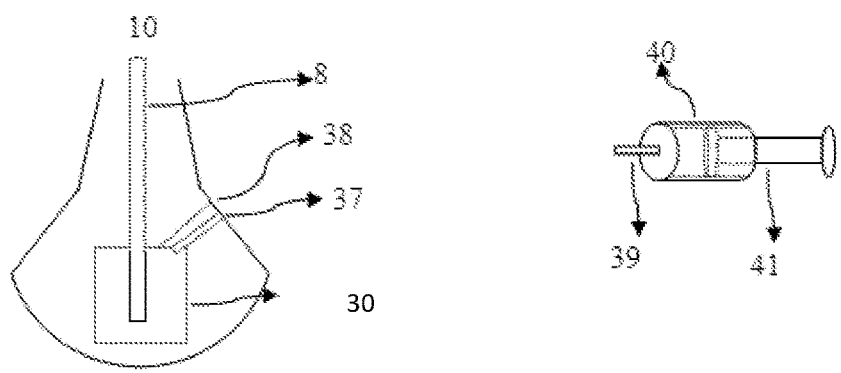
FIG. 10 is another embodiment of the water storage module of the tooth cleaner disclosed by the embodiment of the invention.

As another embodiment of the water storage module 12 disclosed by the invention, reference to FIG. 10, the water storage module 12 can be provided with a water injection hole 37 and an air return hole 38 in one end of the hollow cavity 30, and the water injection module is preferably a water injection pipe composed of an insertion pipe 39, an empty cylinder 40 and a piston core rod 41. When the rinse solution is required to be injected into the water storage module 12 of the cleaner by the user, the insertion pipe of the water injection pipe is firstly inserted to a vessel for holding the liquid, preferably the rinse solution, by the user, and the piston core rod 41 is outwards drawn to suck the rinse solution into the empty cylinder of the water injection pipe. Next, the insertion pipe of the water injection pipe is inserted to the water injection hole 37 by the user. When the front end of the insertion pipe of the water injection pipe supports against the water injection hole 37, the water injection hole 37 is extruded by the insertion pipe, so that the empty cylinder of the water injection pipe communicates with the hollow cavity 30 of the water storage module 12 of the cleaner by a small hole in the front end of the insertion pipe. Then, the piston core rod 41 of the water injection pipe is forwards pushed by the user to make the rinse solution in the empty cylinder of the water injection pipe flow into the hollow cavity 30 of the water storage module 12 of the cleaner from the small hole in the front end of the insertion pipe. The water injection pipe is portable; the user can voluntarily allocate and select the used cleaning liquid without using the matched water storage box, so that individual tooth cleaning is realized.

Figure 11:
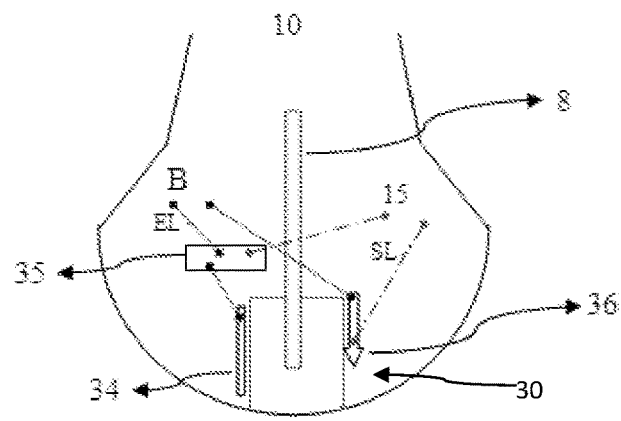
FIG. 11 is yet another embodiment of the water storage module of the tooth cleaner disclosed by the embodiment of the invention.

In the embodiments of the water storage module 12 as shown in FIG. 8, FIG. 9 and FIG. 10, the water storage module 12 in each of the embodiments can also be provided with a heating unit, reference to FIG. 11, the heating unit comprises an electric heating plate 34, a temperature sensor 36 and a heating program control switch 35, wherein the electric heating plate 34 is arranged on the side wall of the hollow cavity 30, one end of the electric heating plate 34 is connected with the heating program control switch 35, the heating program control switch 35 is connected with the power supply switch module 16 inside the handle 2 by a conducting wire, and is connected with the intelligent control module 15 in the handle 2 by a signal line, one end of the electric heating plate 34 is also connected with the temperature sensor 36, the temperature sensor 36 is connected with the power supply switch module 16 by a conducting wire, and is connected with the intelligent control module 15 by a signal line.

The temperature sensor 36 is used for transmitting the current temperature information of the water storage module 12 to the intelligent control module 15 by a signal line, the intelligent control module 15 is used for periodically comparing the received current temperature with a set temperature value, preferably, within the range of 34-40 DEG C, and particularly, within the range of 35-37 DEG C, of the water storage module 12, if the current temperature is lower than the lower limit of the set value of the water storage module 12, the intelligent control module 15 sends a control signal for "electric heating starting", the heating program control switch 35 is turned on, and the electric heating plate 34 begins to perform heating operation, when the temperature is higher than the upper limit of the set temperature value of the water storage module 12, the intelligent control module 15 sends a control signal for "electric heating starting", the heating program control switch 35 is turned off, and the electric heating plate 34 stops operating. Therefore, the liquid in the water storage module 12 is kept at the temperature that the user feels comfortable in the oral cavity, and the condition that the oral cavity of the user is irritated by overlow or overhigh temperature of the liquid is avoided.

Preferably, the handle part 2 of the cleaner is internally provided with an audio module 23 providing storage, control and voice playing functions for audio data, wherein the audio data stored in the audio module 23 can comprise an audio data set. The audio data set is composed of a plurality of audio data fragments, and the specific content of the audio data is exampled as follows: the audio data fragment 1: Hello; the audio data fragment 2: the first tooth cleaning action is completed, you are so good; the audio data fragment 3: I am going to have a rest, see you; and the audio data fragment 4: please brush your teeth.

Preferably, the handle part 2 of the cleaner is internally provided with a wireless communication module 22, and the wireless communication module 22 provides information receiving and transmitting functions for the intelligent control module 15, so that intercommunication between the cleaner and an intelligent terminal of the user can be realized.

Preferably, each of the modules of the brace part 1 and the handle part 2 of the cleaner is uniformly packaged inside a shell. The upper part (the part close to the brace 1) of the handle part 2 of the cleaner is relatively thin, and the lower part (the part far away from the brace 1) of the handle part 2 is relatively thick. Modules with relatively large masses, such as a power supply module 17, are embedded into the lower part of the handle part 2. In order to ensure that the gravity center of the whole shell of the cleaner is low enough, the lower part of the handle 2 of the cleaner can also be provided with a counterweight module 26. Therefore, the cleaner can roll over if the initial contact part of the cleaner and a horizontal surface is not the bottom end 3 of the handle when the cleaner is placed on the horizontal plane, so that the bottom end 3 of the handle 2 finally becomes the contact part of the cleaner and the horizontal plane.

According to the embodiment of the invention, the intelligent control module 15 receives a sensing signal for the occlusion action of the user from the pressure sensors 18 and acquires the temperature information of the water storage module from the temperature sensor; and the intelligent control module 15 respectively outputs control signals to the excitation module 14, the pump module 9, a valve module 19 and the water storage module 12 to control the actions of the modules. Specifically, the intelligent control module 15 outputs control signals for excitation action starting, excitation action stopping and strength or frequency of an acoustic or ultrasonic frequency current generated by an excitation action to the excitation module 14.

The intelligent control module 15 outputs control signals of a pressure pumping action starting, a pressure pumping action stopping and pressure pumping action strength to the pump module 9.

The intelligent control module 15 outputs a passage selection instruction to the valve module 19 to perform selective opening or closing operation on each passage.

The intelligent control module 15 outputs control signals for electric heating starting and electric heating stopping to the water storage module 12.

The intelligent control module 15 outputs a fragment selection instruction to the audio module 23 to select each audio data fragment in the audio module 23.

According to the embodiment of the invention, the tooth cleaning operation of the cleaner is as follows:

when the cleaner is starter, the initial value of an occlusion action counter recorded by the intelligent control module 15 is zero.

1) The user stuffs the brace 1 of the cleaner into the oral cavity to enclose the upper and lower dentitions by the brace part 1 of the cleaner.

2) The user performs a teethridge occlusion action. At the moment, each of the slits among the teeth of the upper and lower dentitions of the user and the outer end points of molar teeth at two sides of the upper and lower dentitions respectively correspond to the small open holes 7 in the inner wall surfaces of the upper tooth socket and the lower tooth socket of the brace 1.

3) The occlusion action of the user is detected by the sensor embedded in the brace part 1 of the cleaner. The sensor transmits the detected occlusion action signal to the intelligent control module 15 by a signal line.

4) The occlusion action counter n of the intelligent control module 15 is added with 1 and performs modularization on 6 (n mod(6)).

Next, the cleaner performs the following actions:

4.1) firstly, the intelligent control module 15 selects a passage selection instruction from a passage selection instruction set of the valve module 19 according to a predetermined order of a preset mode of the valve module 19 and the 6 modularization value (n mod(6)) of the occlusion action counter.

4.1.1) The intelligent control module 15 sends a passage selection instruction to the valve module 19.

4.1.2) After receiving the passage selection instruction, the valve module 19 performs an opening/closing action according to the requirement of the instruction, so that only some one or some passages in a series of outlet passages of the valve module 19 are in an opened state, and the rest passages are in a closed state.

4.1.3) Then, the intelligent control module 15 sends a pressure pumping starting instruction to the pump module 19.

4.1.4) The pump module 9 repeatedly performs a pressure pumping action.

4.1.5) The liquid in the water storage module is sucked into the guide pipe under the action of a pump pressure and produces a "mist" under the action of the piston pump unit, so that the mist is sprayed from the small open holes 7 distributed in the inner wall of the brace part 1 of the cleaner, and furthermore, the slits among the teeth are cleaned.

4.2) After sending the passage selection instruction to the valve module 19, the intelligent control module 15 sends an excitation starting instruction to the excitation module 14.

4.2.1) The excitation module 14 continuously produces the acoustic or ultrasonic frequency current.

4.2.2) The vibrator of the acoustic wave transducer embedded in the brace part 1 of the cleaner produces acoustic or ultrasonic vibration under the excitation of the acoustic or ultrasonic frequency current.

4.2.3) The inner wall of the brace part 1 of the cleaner transfers the acoustic or ultrasonic vibration to the tooth surface of each tooth, so that the tooth surface is cleaned.

5) The user non-occludes teethridges to stop the occlusion action.

6) The occlusion action of the user is detected by the sensor embedded in the brace part 1 of the cleaner. The sensor transmits the detected occlusion action signal to the intelligent control module 15 by the signal line.

Next, the cleaner performs the following actions:

7.1) firstly, the intelligent control module 15 sends a pressure pumping stopping instruction to the pump module 19.

7.2) The pump module 9 stops the pressure pumping action.

7.3) The intelligent control module 15 sends an excitation stopping instruction to the excitation module 14.

7.4) The excitation module 14 stops producing the acoustic or ultrasonic frequency current.

8) The intelligent control module 15 judges whether the occlusion action counter n is an integral multiple of 6 or not, if yes, playing instruction information 2 is transmitted to the audio module 23. After receiving the playing instruction information 2, the audio module 23 plays the audio data fragments 2 of the audio data set.

9) The user performs the teethridge occlusion action again. The step 3) is returned to be further performed.

In the tooth cleaning operation process, the intelligent control module 15 of the cleaner can record and store each action and operation participated by the intelligent control module 15 into a cleaner working log of the intelligent terminal.

The tooth cleaner provided by the invention adopts an electric spray-cleaning way, so that inconvenience caused by manual tooth brushing is omitted, the tooth brushing person only needs to perform occlusion and non-occlusion motion, moving the tooth cleaner about the oral cavity is not needed, and even if no toothpaste is used, the teeth can be effectively cleaned by using bristles, in addition, hidden parts such as the slits among the teeth can be favorably cleaned by the mist sprayed from a cleaning head, and compared with the original electric water spraying or air spraying way, the mist spraying way has a more excellent oral cavity cleaning effect, is good in atomizing effect and also brings more comfortable cleaning experience for the user.

It is noted that the description should not be construed as limitations of the patent scope of the invention, but merely as preferable embodiments thereof, and the material and structure of each of the various parts can also be improved, or replaced with technical equivalents. Therefore, any equivalent structure changes performed according to the description and illustrations of the invention or those directly or indirectly applied to other relevant technical fields fall within the scope of the invention.

The invention claimed is:

1. A tooth cleaner, comprising:
    a brace comprising:
        an upper tooth socket; and
        a lower tooth socket;
    a handle;
    a plurality of small open holes arranged at intervals and distributed in the upper tooth socket and the lower tooth socket,
        wherein at least one of the small open holes is connected with one end of first guide pipe embedded into the brace, and
        wherein one end of the first guide pipe extends into the handle;
    a pump module arranged inside the handle, comprising:
        a pump air outlet connected with the first guide pipe;
        a pump water inlet connected with a water storage module in the handle, and
        a pump air inlet communicating with the handle, and
    a plurality of bulges, wherein:
    at least three of said plurality of bulges are arranged at intervals on the brace, and
        said plurality of bulges comprise a first bulge, wherein an outer perimeter of the fist bulge is closed, and an inner part of the first bulge is hollowed and communicates with a second guide pipe embedded in the inner walls, of the upper tooth socket or the lower tooth socket, of the brace.

2. The tooth cleaner of claim 1, further comprising:
    pressure sensors, embedded between the upper tooth socket and the lower tooth socket.

3. The tooth cleaner of claim 2, further comprising:
    an intelligent control module in the handle; wherein
        the pressure sensors and with the intelligent control module are connected; and the intelligent control module respectively with the water storage module and the pump module are connected.

4. The tooth cleaner of claim 3, further comprising:
a rechargeable battery, a wireless electric energy receiving unit and a display unit provided in the handle,
wherein the wireless electric energy receiving unit is connected with a wireless electric energy transmitting unit on an outer rechargeable base;
the handle is internally provided with a wireless communication module and/or an audio module; and
the wireless communication module and/or the audio module is connected with the intelligent control module.

5. The tooth cleaner of claim 2, further comprising:
an acoustic wave transducer, arranged in the brace or on a position in the handle close to the brace, and connected with an excitation module arranged in the handle.

6. The tooth cleaner of claim 1, wherein
at least three of said plurality of bulges are arranged at intervals on inner walls of the upper tooth socket, and
at least another three of said plurality of bulges are arranged at intervals on inner walls of the lower tooth socket.

7. The tooth cleaner of claim 1, wherein the second guide pipe connected with the bulges are superposed with the first guide pipe connected with the small open holes.

8. The tooth cleaner of claim 1, wherein a plurality of the first guide pipe are in the brace and combined to form at least one public pipeline extending into the handle to be connected with the pump outlet of the pump module.

9. The tooth cleaner of claim 8, further comprising:
a program control valve arranged between the pump module and the brace, connected with the intelligent control module, and comprising:
an inlet passage connected with the pump outlet of the pump module, and
at least two outlet passages connected with the public pipelines extending into the handle part from the brace.

10. The tooth cleaner of claim 1, wherein
the pump module is a program control pump provided with a piston pump unit comprising an electric driving mechanism, a piston core rod and a piston empty cylinder,
at least one opening is fanned in the piston empty cylinder,
a one-way valve is arranged between each of the openings and the pump air inlet, between each of the openings and the pump water inlet, and between each of the openings and the pump outlet.

11. The tooth cleaner of claim 10, wherein
the opening communicating with the pump air inlet is formed in a front end surface or a side end surface of the piston empty cylinder,
the opening communicating with the pump water inlet is formed in the front end surface or the side end surface of the piston empty cylinder, and
the opening communicating with the pump outlet is formed in the front end surface of the piston empty cylinder.

12. The tooth cleaner of claim 10, wherein
the opening communicating with the pump air inlet is formed in a front end surface or a side end surface of the piston empty cylinder,
the opening communicating with the pump outlet is formed in the front end surface of the piston empty cylinder, and
the pump outlet is connected with the opening formed in the front end surface of the piston empty cylinder.

13. The tooth cleaner of claim 1, further comprising:
a connecting part, connecting the upper tooth socket with the lower tooth socket, and integrally molded together with the upper tooth socket and the lower tooth socket.

14. The tooth cleaner of claim 1, wherein
a gap is formed on the upper tooth socket.

15. The tooth cleaner of claim 1, wherein
the water storage module comprises:
a hollow cavity connected with the pump water inlet of the pump module; and
a water storage box matched with the hollow cavity;
or
a hollow cavity of which one end is connected with the pump water inlet of the pump module;
an openable sealing cover; and
an air return aperture.

16. The tooth cleaner of claim 1, wherein
the water storage module comprises:
a hollow cavity connected with the pump water inlet of the pump module;
a water injection hole formed in the hollow cavity; and
an air return hole formed in the hollow cavity, the cleaner further comprises:
a water injection module matched with the hollow cavity and composed of an insertion pipe, an empty cylinder and a piston core rod, wherein the insertion pipe can be inserted to the water injection hole to inject water to the water storage module.

* * * * *